United States Patent
Kim et al.

(10) Patent No.: US 11,240,810 B2
(45) Date of Patent: Feb. 1, 2022

(54) METHOD OF OPERATING TERMINAL IN WIRELESS COMMUNICATION SYSTEM AND THE TERMINAL

(71) Applicant: SAMSUNG ELECTRONICS CO., LTD., Suwon-si (KR)

(72) Inventors: Ki-young Kim, Hwaseong-si (KR); Kyung-hwan Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 344 days.

(21) Appl. No.: 16/514,558

(22) Filed: Jul. 17, 2019

(65) Prior Publication Data
US 2020/0137739 A1    Apr. 30, 2020

(30) Foreign Application Priority Data
Oct. 24, 2018   (KR) .......................... 10-2018-0127692

(51) Int. Cl.
*H04W 72/04* (2009.01)
*H04W 72/02* (2009.01)
*H04B 17/318* (2015.01)

(52) U.S. Cl.
CPC ......... *H04W 72/046* (2013.01); *H04W 72/02* (2013.01); *H04B 17/318* (2015.01)

(58) Field of Classification Search
None
See application file for complete search history.

(56) References Cited

U.S. PATENT DOCUMENTS

| | | | |
|---|---|---|---|
| 9,450,661 B2 | 9/2016 | Yu et al. | |
| 9,681,341 B2 | 6/2017 | Ryu et al. | |
| 9,923,682 B2 | 3/2018 | Jeong et al. | |
| 2015/0358129 A1 | 12/2015 | Ryu et al. | |
| 2016/0365900 A1 | 12/2016 | Kim et al. | |
| 2017/0111852 A1 | 4/2017 | Selén et al. | |
| 2017/0339575 A1 | 11/2017 | Kim et al. | |
| 2017/0367120 A1 | 12/2017 | Murray et al. | |
| 2017/0373740 A1 | 12/2017 | Guo et al. | |
| 2018/0109303 A1 | 4/2018 | Yoo et al. | |
| 2018/0343043 A1* | 11/2018 | Hakola | H04B 7/0417 |
| 2019/0104549 A1* | 4/2019 | Deng | H04W 72/0446 |
| 2019/0327762 A1* | 10/2019 | Takeda | H04W 72/0406 |

FOREIGN PATENT DOCUMENTS

| | | |
|---|---|---|
| KR | 10-2018-0060883 A | 6/2018 |
| KR | 10-2018-0072402 A | 6/2018 |

* cited by examiner

*Primary Examiner* — Shripal K Khajuria
(74) *Attorney, Agent, or Firm* — Sughrue Mion, PLLC

(57) ABSTRACT

A method of operating a terminal is provided. The method includes: selecting a first pattern as a pattern of a reception beam; searching for cells in the wireless communication system using the reception beam of the first pattern; determining a first candidate group including at least one candidate for a beam pattern pair with the first pattern of the reception beam, wherein each of the at least one candidate corresponds to a transmission beam pattern and a cell; determining whether to decode a physical broadcast channel received from a first candidate of the first candidate group; decoding the PBCH based on the determining; and selecting one of the transmission beam patterns for the beam pattern pair with the first pattern of the reception beam from the first candidate group based on the decoding.

20 Claims, 14 Drawing Sheets

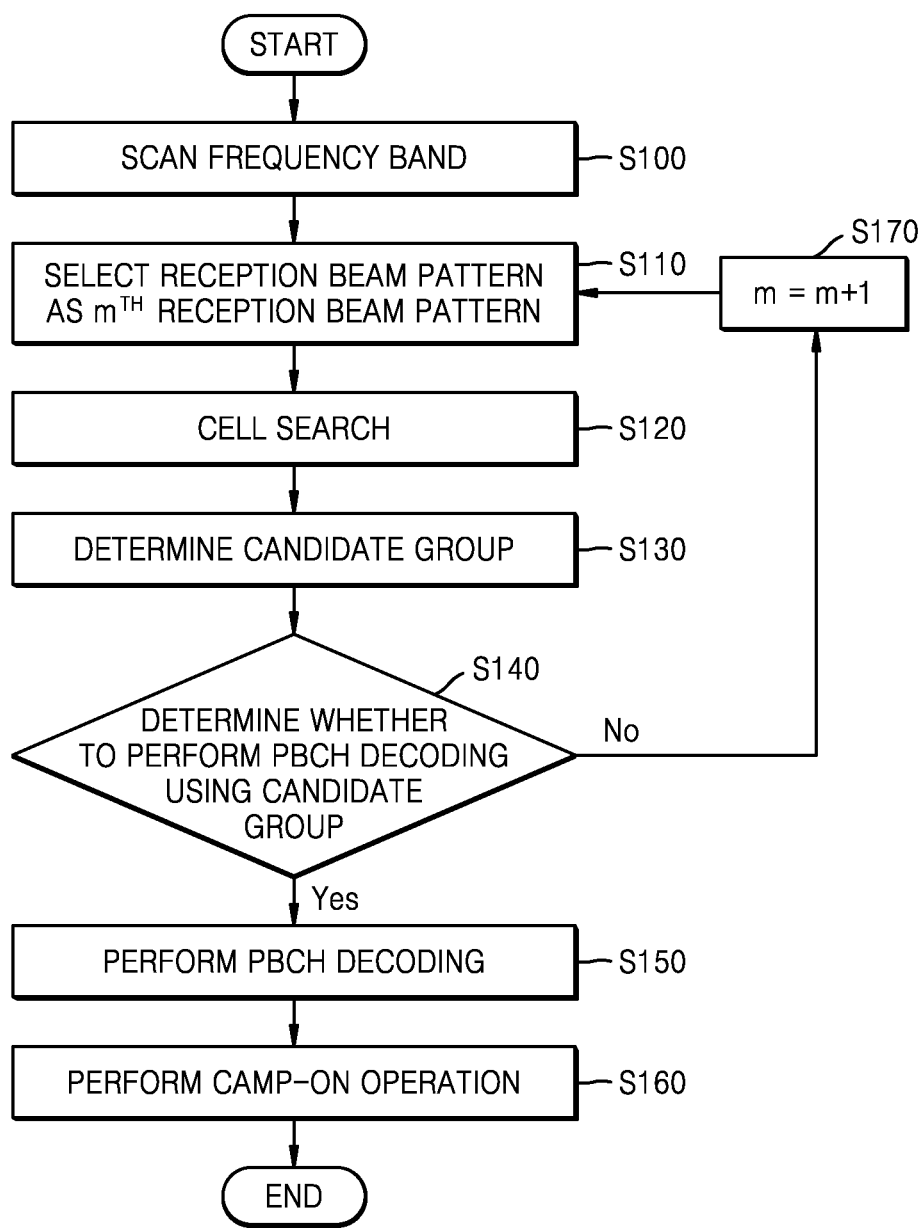

METHOD OF OPERATING TERMINAL IN WIRELESS COMMUNICATION SYSTEM AND THE TERMINAL

CROSS-REFERENCE TO RELATED APPLICATION

This application claims priority from Korean Patent Application No. 10-2018-0127692, filed on Oct. 24, 2018 in the Korean Intellectual Property Office, the disclosure of which is incorporated herein by reference in its entirety.

BACKGROUND

Example embodiments of the present disclosure relate to determining a transmission and reception beam pattern pair in a wireless communication system.

A 5G communication system aims to provide an ultra-high-speed data service of several gigabits per second (Gbps) using an ultra-wideband with a bandwidth of 100 megahertz (MHz) or more, compared to existing long-term evolution (LTE) and LTE-advanced (LTE-A), as new wireless access technology. However, because it is difficult to secure an ultra-wideband frequency of 100 MHz or more in a frequency band of several hundred MHz or several gigahertz (GHz), such as those frequency bands used in LTE and LTE-A, a method of transmitting a signal using a wide frequency band in a frequency band of 6 GHz or more is needed in the 5G communication system. In more detail, in the 5G communication system, a transmission rate is increased using a millimeter wave band such as a 28 GHz band or a 60 GHz band. However, because the frequency band and path loss of a radio wave are proportional, the path loss of the radio wave is large due to the very high frequency wave. Therefore, a service area is reduced.

In order to overcome drawbacks of such a service area reduction in the 5G communication system, beamforming technology may be used to increase a reaching distance of a radio wave by generating a directional beam using a plurality of antennas. The beamforming technology may be applied to a transmission device (e.g., a base station) and a receiving device (e.g., a terminal), respectively. In addition to the enlargement of the service area, the beamforming technology may also reduce interference due to a beam being focused in a target direction.

In the 5G communication system, the direction of a transmission beam of a cell (or a transmission device) and the direction of a reception beam of a terminal need to be mutually aligned to increase the effect of the beamforming technology. Thus, a technique of determining a transmission and reception beam pattern pair for aligning the transmission beam and the reception beam has been studied.

SUMMARY

One or more example embodiments provide a terminal capable of effectively and quickly determining a transmission and reception beam pattern pair for aligning a transmission beam of a cell and a reception beam of a terminal in accordance with a communication environment of a 5G wireless communication system, and a method of operating the terminal.

According to an aspect of an example embodiment, there is provided a method of operating a terminal in a wireless communication system, the method including: selecting a first pattern as a pattern of a reception beam; searching for a plurality of cells in the wireless communication system using the reception beam of the first pattern; determining a first candidate group including at least one candidate for a transmission and reception beam pattern pair with the first pattern of the reception beam, from among transmission beam patterns of the plurality of cells based on the searching, wherein each of the at least one candidate corresponds to a transmission beam pattern of the transmission beam patterns and a cell of the plurality of cells; determining whether to decode a physical broadcast channel (a PBCH) received from a first candidate of the first candidate group; decoding the PBCH based on the determining; and selecting one of the transmission beam patterns for the transmission and reception beam pattern pair with the first pattern of the reception beam from the first candidate group based on the decoding.

According to an aspect of an example embodiment, there is provided a terminal configured to operate in a wireless communication system, the terminal including: a plurality of antennas; and a baseband processor configured to: control the plurality of antennas such that a reception beam of the terminal has a pattern; control a beam sweep operation using the reception beam of the pattern; search for a plurality of cells in the wireless communication system using the pattern the reception beam as a first pattern for a first beam sweep operation; determine a first candidate group including at least one candidate that is selectable for the transmission and reception beam pattern pair with the first pattern of the reception beam from transmission beam patterns of the plurality of cells based on a result of the searching; determine whether to decode a physical broadcast channel (a PBCH) received from a first candidate of the first candidate group; decode the PBCH based on the determining; and select one of the transmission beam patterns for the transmission and reception beam pattern pair with the first pattern of the reception beam from the first candidate group.

According to an aspect of an example embodiment, there is provided a non-transitory computer-readable storage medium storing computer readable instructions, the computer readable instructions, when executed by a processor in a terminal that determines a transmission and reception beam pattern pair, cause the terminal to: select a first pattern as a pattern of a reception beam; search for a plurality of cells using the reception beam of the first pattern; determine a first candidate group including a candidate for the transmission and reception beam pattern pair with the first pattern of the reception beam, from among transmission beam patterns of the plurality of cells; determining whether to decode a physical broadcast channel (a PBCH) received from a first candidate of the first candidate group; decode the PBCH based on the determining; and select one of the transmission beam patterns for the transmission and reception beam pattern pair with the first pattern of the reception beam based on the decoding.

BRIEF DESCRIPTION OF THE DRAWINGS

The above and other aspects, features and advantages will be more clearly understood from the following detailed description taken in conjunction with the accompanying drawings in which:

FIG. 3 is a flowchart of a method of operating a terminal according to an example embodiment;

DETAILED DESCRIPTION

A base station communicates with a terminal and allocates communication network resources to the terminal. The base station may be at least one of a cell, a base station (BS), a NodeB (NB), an eNodeB (eNB), a next generation radio access network (NG RAN), a radio access unit, a base station controller, or a node on a network. Hereinafter, the base station is referred to as a cell.

The terminal (or a communication terminal) communicates with a cell or another terminal and may be referred to as a node, user equipment (UE), next generation UE, a mobile station (MS), mobile equipment (ME), a device, a terminal, or the like.

Furthermore, the terminal may include at least one of smart phones, tablet personal computers (PCs), mobile phones, video telephones, E-book readers, desktop PCs, laptop PCs, netbook computers, portable multimedia players (PDPs), MP3 players, medical devices, cameras, and wearable devices. The terminal may also include at least one of televisions (TVs), digital versatile disk (DVD) players, audio devices, refrigerators, air conditioners, vacuum cleaners, ovens, microwave ovens, washing machines, air purifiers, set-top boxes, home automation control panels, security control panels, media boxes (e.g., Samsung HomeSync™, Apple TV™, or Google TV™), game consoles (e.g., Xbox™, PlayStation™), electronic dictionaries, electronic keys, camcorders, or electronic photo frames. The terminal may also include at least one of, for example, various medical devices (e.g., various portable medical measuring instruments (such as a blood glucose meter, a heart rate meter, a blood pressure meter, or a body temperature meter), magnetic resonance angiography (MRA), magnetic resonance imaging (MRI), computed tomography (CT), cameras, or ultrasound devices), navigation devices, a global navigation satellite system (GNUS), an event data recorder (EDR), a flight data recorder (FDR), automotive infotainment devices, marine electronic devices (e.g., marine navigation device, gyro compass, etc.), avionics, security devices, car head units, industrial or household robots, drones, automatic teller machines (ATMs) at financial institutions, point of sale (POS) of stores, or Internet of Things (IoT) devices (e.g., light bulbs, various sensors, sprinkler devices, fire alarms, thermostats, street lights, toasters, exercise equipment, hot water tanks, heaters, boilers, etc.). Furthermore, the terminal may include various types of multimedia systems capable of performing communication functions.

Figure 1:
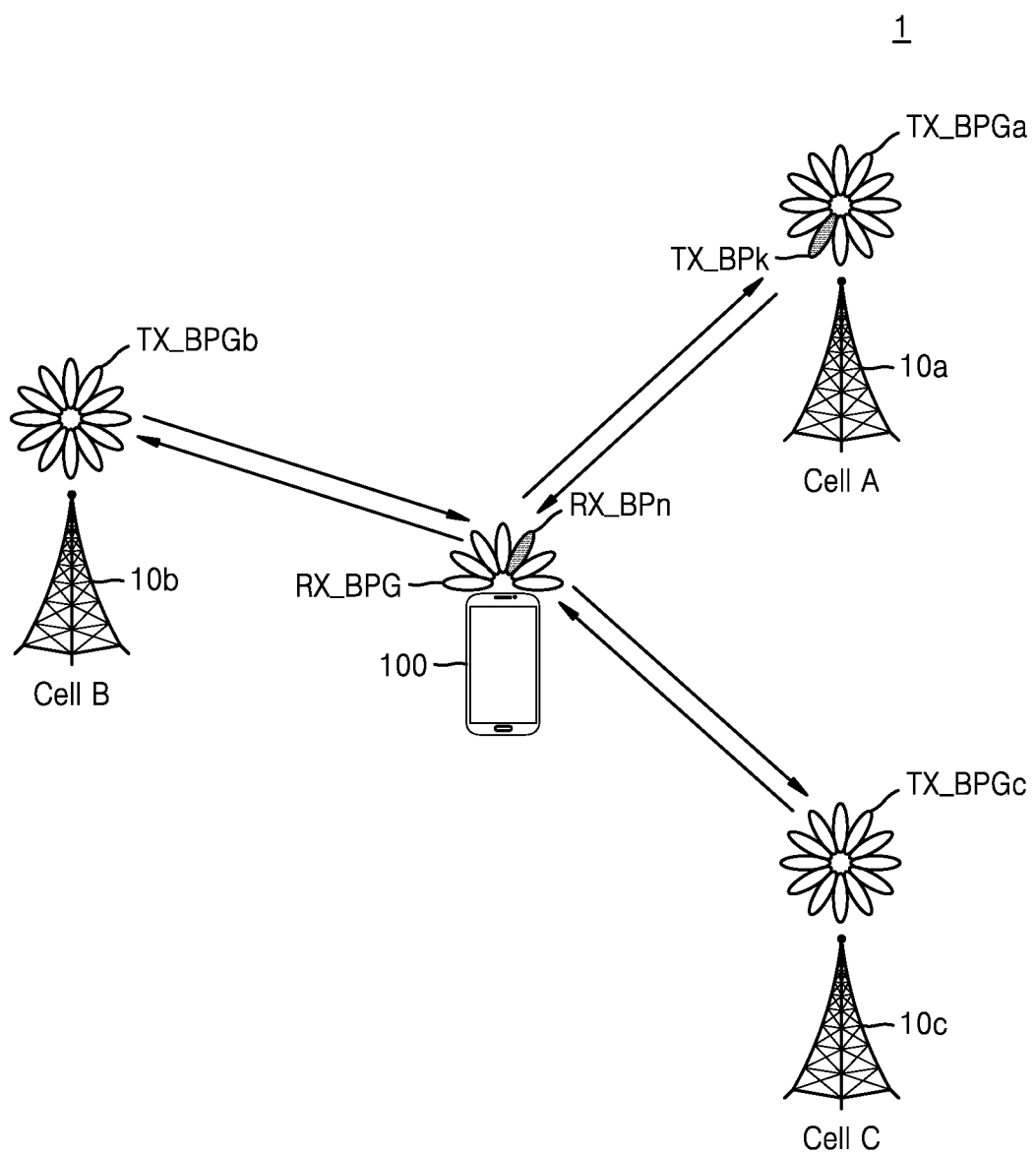
FIG. 1 is a block diagram of a wireless communication system according to an example embodiment.

FIG. 1 is a block diagram of a wireless communication system 1 according to an example embodiment.

Referring to FIG. 1, the wireless communication system 1 may include a plurality of cells 10a, 10b and 10c, and a terminal 100. For convenience of description, the wireless communication system 1 is shown in the drawings to include only three cells 10a, 10b and 10c, but example embodiments are not limited thereto. The wireless communication system 1 may include various numbers of cells. The cells 10a, 10b and 10c may be connected to the terminal 100 through a wireless channel to provide various communication services. The cells 10a, 10b and 10c may service all user traffic over a shared channel and may be scheduled by collecting state information such as a buffer state, an available transmission power state, and a channel state of the terminal 100. The wireless communication system 1 may support beamforming technology using orthogonal frequency division multiplexing (OFDM) as radio access technology. The wireless communication system 1 may also support a modulation method and an adaptive modulation & coding (AMC) method for determining a channel coding rate, according to a channel state of the terminal 100.

Furthermore, the wireless communication system 1 may transmit and receive signals using a wide frequency band existing in a frequency band of 6 GHz or more. For example, in the wireless communication system 1, a data transmission rate may be increased by using a millimeter wave band such as a 28 GHz band or a 60 GHz band. Here, because the millimeter wave band has a relatively large signal attenuation amount per distance, the wireless communication system 1 may support directional beam-based transmission and reception, the directional beam being generated using multiple antennas for ensuring coverage. The wireless communication system 1 according to an example embodiment may perform a beam sweep operation for the directional beam-based transmission/reception.

The beam sweep operation is a process in which the terminal 100 and the cells 10a, 10b and 10c sequentially or randomly sweep directional beams having a certain pattern and determine a transmission beam and a reception beam of which directions are aligned with each other. That is, a pattern of the transmission beam and the reception beam of which directions are aligned with each other may be determined as a transmission and reception beam pattern pair. A beam pattern may be the shape of a beam determined by the width of the beam and the direction of the beam, and a beam sweep operation according to an example embodiment will be described later below. For example, the first cell 10a may transmit transmission beams in a plurality of patterns TX_BPGa, the second cell 10b may transmit transmission beams in a plurality of patterns TX_BPGb, and the third cell 10c may transmit transmission beams in a plurality of patterns TX_BPGc. Also, the terminal 100 may generate reception beans in a plurality of patters RX_BPG.

Each of the cells 10a, 10b and 10c transmits a transmission beam having a certain pattern at a first point in time (which may be an arbitrary point in time) and transmits, at a second point in time, a transmission beam having a different pattern from that of the transmission beam at the first point in time. Each of the cells 10a, 10b and 10c may transmit the transmission beams in all directions for a certain period of time. For example, the first cell 10a may sequentially or randomly sweep and transmit first transmission beams having various patterns TX_BPGa for a certain period of time, the second cell 10b may sequentially or randomly sweep and transmit second transmission beams having various patterns TX_BPGb, and the third cell 10c may sequentially or randomly sweep and transmit third transmission beams having various patterns TX_BPGc.

The terminal 100 may generate a reception beam having a certain pattern at a first point in time (which may be an arbitrary point in time) using multiple antennas and generate, at a second point in time, a reception beam having a different pattern from that of the reception beam at the first point in time. The terminal 100 may generate reception beams in all directions for a certain period of time. For example, the terminal 100 may generate reception beams having various patterns RX_BPG by sequentially or randomly sweeping them for a certain period.

The terminal 100 may search for an optimal transmission beam and reception beam that provide the best reception quality by matching a plurality of transmission beams to a plurality of reception beams through a beam sweep operation. The terminal 100 according to an example embodiment may select a pattern (which may be an arbitrary pattern) from among a plurality of reception beam patterns RX_BPG and perform a beam sweep operation by using a reception beam having the selected pattern. That is, the terminal 100 may perform a beam sweep operation in units of one reception beam pattern. Based on a result of the beam sweep operation, the terminal 100 may determine a transmission and reception beam pattern pair by searching for a transmission beam pattern which is paired with the reception beam pattern and may provide reception quality higher than a threshold level. For example, the terminal 100 may perform a beam sweep operation and may find an $n^{th}$ reception beam pattern RX_BPn, from among the plurality of reception beam patterns RX_BPG, and a $k^{th}$ transmission beam pattern TX_BPk, from among a plurality of transmission beam patterns TX_BPGa of the first cell 10a, that can provide reception quality higher than a threshold level with the identified reception beam pattern RX_BPn, using the result of the beam sweep operation.

Furthermore, the terminal 100 may group the plurality of reception beam patterns RX_BPG into a plurality of groups and perform a beam sweep operation on a group basis. In more detail, the terminal 100 may search for the cells 10a, 10b and 10c in the wireless communication system 1 using a reception beam having a selected pattern. For example, the selected pattern may include two or more reception beam patterns. Thereafter, the terminal 100 may determine a candidate group including at least one candidate that is selectable for a transmission and reception beam pattern pair with a reception beam pattern from the transmission beam patterns TX_BGa to TX_BGc, based on a result of the search. For example, the candidate may correspond to any of the transmission beam patterns TX_BPGa, TX_BPGb and TX_BPGc of the cells 10a, 10b and 10c. The terminal 100 may select one candidate from the candidate group and determine whether to decode a received physical broadcast channel (PBCH) through the selected candidate. For example, the selected candidate may be the $k^{th}$ transmission beam pattern TX_BPk of the first cell 10a, and the PBCH received through the selected candidate may be a PBCH received from the first cell 10a through a transmission beam having the $k^{th}$ transmission beam pattern TX_BPk. A portion of system information necessary for the terminal 100 to access a network may be transmitted over the PBCH, and the terminal 100 may decode contents of the PBCH to obtain a portion of the system information. The terminal 100 may select a pattern of a reception beam and a pattern of a transmission beam that are a transmission and reception beam pattern pair, based on a result of the decoding.

When the terminal 100 cannot search for the cells 10a, 10b and 10c using a reception beam having a selected pattern or cannot determine the candidate group, the terminal 100 may perform a beam sweep operation by selecting the next pattern from among the plurality of reception beam patterns RX_BPG.

As such, the terminal 100 according to an example embodiment may select one of the plurality of reception beam patterns RX_BPG to perform the beam sweep operation without determining an ideal transmission beam pattern pair corresponding to respective transmission beam patterns TX_BPGa, TX_BPGb and TX_BPGc of the cells 10a, 10b and 10c while sequentially or randomly selecting all reception beam patterns RX_BPG. The terminal 100 may also determine a transmission and reception beam pattern pair by finding a transmission beam pattern that satisfies a certain criterion. Accordingly, the terminal 100 may more quickly determine a transmission and reception beam pattern pair capable of providing a reception quality higher than a threshold level, thereby providing a communication service suitable for a communication environment of the wireless communication system 1 in which the communication environment may change rapidly.

Figure 2:
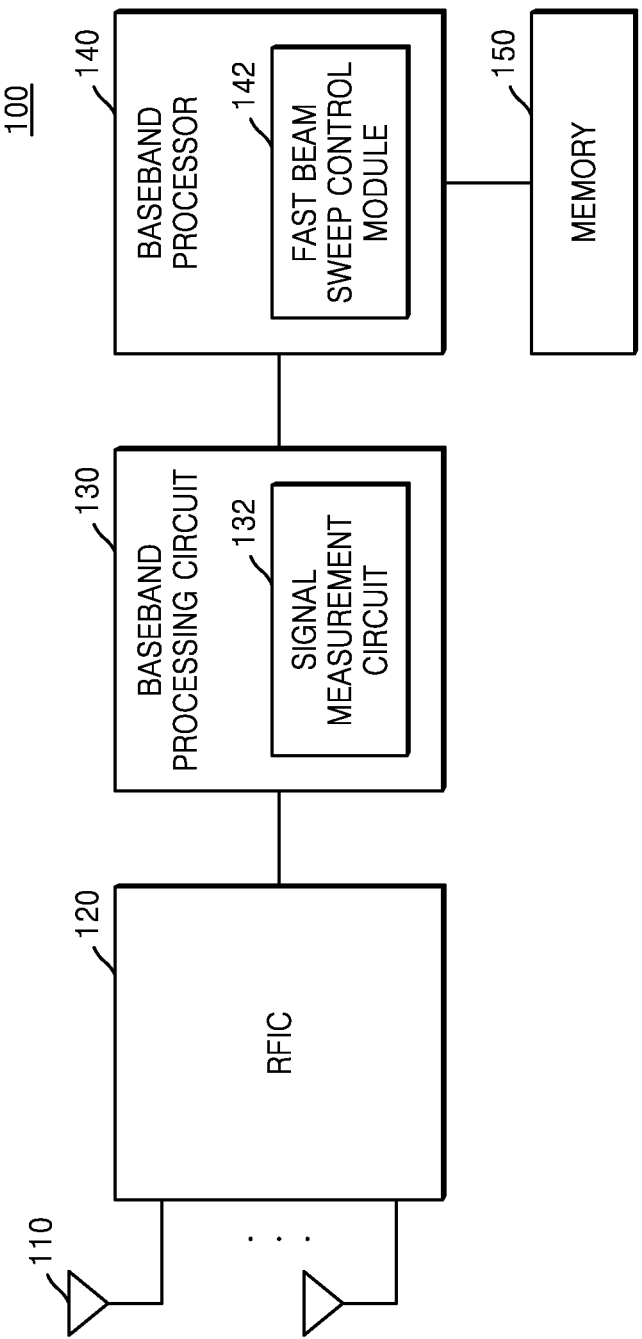
FIG. 2 is a block diagram of a terminal according to an example embodiment.

FIG. 2 is a block diagram of the terminal 100 according to an example embodiment.

Referring to FIG. 2, the terminal 100 may include a plurality of antennas 110, an RF integrated circuit 120, a baseband processing circuit 130, a baseband processor 140, and a memory 150. The terminal 100 of FIG. 2 is merely an example and example embodiments are not limited thereto. The baseband processing circuit 130 may be included in the RF integrated circuit 120 or included in the baseband processor 140. The terminal 100 receives transmission beams having various transmission beam patterns TX_BPGa, TX_BPGb and TX_BPGc from the cells 10a, 10b and 10c of FIG. 1 to determine a transmission and reception beam pattern pair.

The antennas 110 may transmit signals received by the RF integrated circuit 120 through a wireless channel and receive signals on the wireless channel. The antennas 110 may support beamforming and may be implemented as an array antenna, a patch antenna, or the like. The RF integrated circuit 120 may low-noise amplify RF signals received from the antennas 110 and may perform frequency down-conversion on a baseband signal. The baseband processing circuit 130 may perform a function of converting a baseband signal and a bit string according to a physical layer standard. For example, the baseband processing circuit 130 may demodulate and decode the baseband signal provided from the RF integrated circuit 120 to recover the received bit string. The baseband processing circuit 130 may also include a signal measurement circuit 132, and the signal measurement circuit 132 may measure the strength of the baseband signal based on various measurement methods. However, this is only an example and example embodiments are not limited thereto. The signal measurement circuit 132 may measure the strength of an RF signal before the RF signal is converted into the baseband signal. Here, the signal measurement circuit 132 may be included in the RF integrated circuit 120.

The baseband processor 140 may control operations related to data communication with cells of the terminal 100. The baseband processor 140 may include a fast beam sweep control module 142 for controlling operations to determine a transmission and reception beam pattern pair according to an example embodiment. The fast beam sweep control module 142 may select any one of a plurality of reception beam patterns and control the performance of a beam sweep operation by using the selected reception beam pattern. The fast beam sweep control module 142 may control the antennas 110 to generate a reception beam having the selected reception beam pattern and may receive transmission beams having various transmission beam patterns from the cells through the generated reception beam. The fast beam sweep control module 142 may perform a cell search with the beam sweep operation by using the strengths of transmission beams measured by the signal measurement circuit 132 and determine a candidate group. Hereinafter, an operation of the fast beam sweep control module 142 will be described.

The fast beam sweep control module 142 may be implemented in a hardware logic unit in the baseband processor 140. In addition, the fast beam sweep control module 142 may be implemented in a software logic unit stored in the memory 150 as a plurality of command codes and executed by the baseband processor 140.

The memory 150 may store data such as a basic program, an application program, and setting information for the operation of the terminal 100, and may provide the stored data at the request of the baseband processor 140. The memory 150 may include, for example, an internal memory or an external memory. The internal memory may include, for example, at least one of a volatile memory (e.g., dynamic random access memory (DRAM), static random access memory (SRAM), synchronous DRAM (SDRAM), or the like), a nonvolatile memory (e.g., one-time programmable read-only memory (OTPROM), programmable ROM (PROM), erasable and programmable ROM (EPROM), electrically erasable and programmable ROM (EEPROM), mask ROM, flash ROM, or the like), a flash memory, a hard-disk drive (HDD), and a solid-state drive (SSD). The external memory may include a flash drive such as compact flash (CF), secure digital (SD), micro-SD, mini-SD, extreme digital (xD), a multi-media card (MMC), or a memory stick. The external memory may be functionally or physically connected to the terminal 100 via various interfaces.

FIG. 3 is a flowchart of a method of operating a terminal 100 according to an example embodiment.

Referring to FIG. 3, in operation S100, the terminal 100 may scan a frequency band of signals transmitted by cells in a wireless communication system. The terminal 100 may scan a frequency band, recognize a frequency band used by a cell for signal transmission, and generate a reception beam having a frequency corresponding to the frequency band. In operation S110, the terminal 100 may generate a reception beam by selecting an $m^{th}$ reception beam pattern (which may be an arbitrary reception beam pattern) from among a plurality of reception beam patterns.

In operation S120, the terminal 100 may perform cell search using a reception beam having the $m^{th}$ reception beam pattern. That is, the terminal 100 may perform cell search by receiving transmission beams of various transmission beam patterns transmitted from the cells through the reception beam having the $m^{th}$ reception beam pattern. A cell search method will be described in detail with reference to FIGS. 4A and 4B.

In operation S130, the terminal 100 may determine a candidate group including at least one candidate that is selectable for a transmission and reception beam pattern pair with the $m^{th}$ reception beam pattern from among transmission beam patterns of found cells based on a result of the cell searching.

In operation S140, the terminal 100 may determine whether to perform PBCH decoding by using the candidate group. A detailed description of operation S140 will be given with reference to FIGS. 5A and 5B.

In operation S150, when the terminal 100 determines to perform decoding of the PBCH received from a cell (e.g., a $k^{th}$ cell) corresponding to a specific candidate through a transmission beam having a transmission beam pattern that is a specific candidate (e.g., a $k^{th}$ transmission beam pattern) in a candidate group (Yes in operation S140), the terminal may perform PBCH decoding. When the 100 succeeds in the PBCH decoding, the terminal 100 may determine an $m^{th}$ reception beam pattern and the $k^{th}$ transmission beam pattern as a transmission and reception beam pattern pair.

In operation S160, the terminal 100 may generate a reception beam having the $m^{th}$ reception beam pattern and may perform a camp-on operation on the $k^{th}$ cell through a transmission beam having the $k^{th}$ transmission beam pattern. Through the camp-on operation, the terminal 100 may be connected to a certain network supported by the $k^{th}$ cell, and may receive a wireless communication service from the network.

In operation S170, when the terminal 100 determines not to perform the decoding of the PBCH (No in S140), the terminal 100 counts up the value of m and may select a different reception beam pattern in operation S110.

Figure 4A:
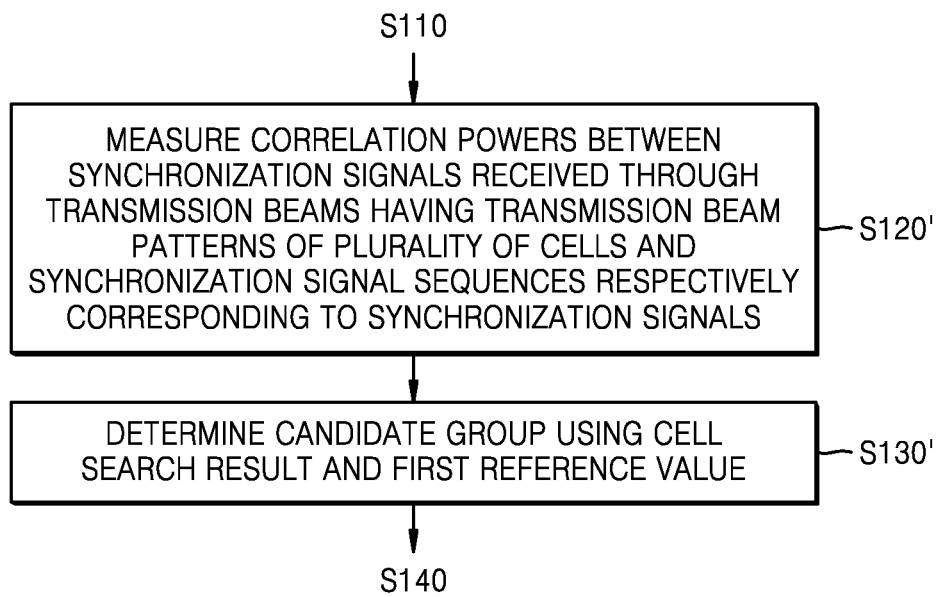
FIGS. 4A and 4B are views for explaining operation S120 in FIG. 3 in detail.
Figure 4B:
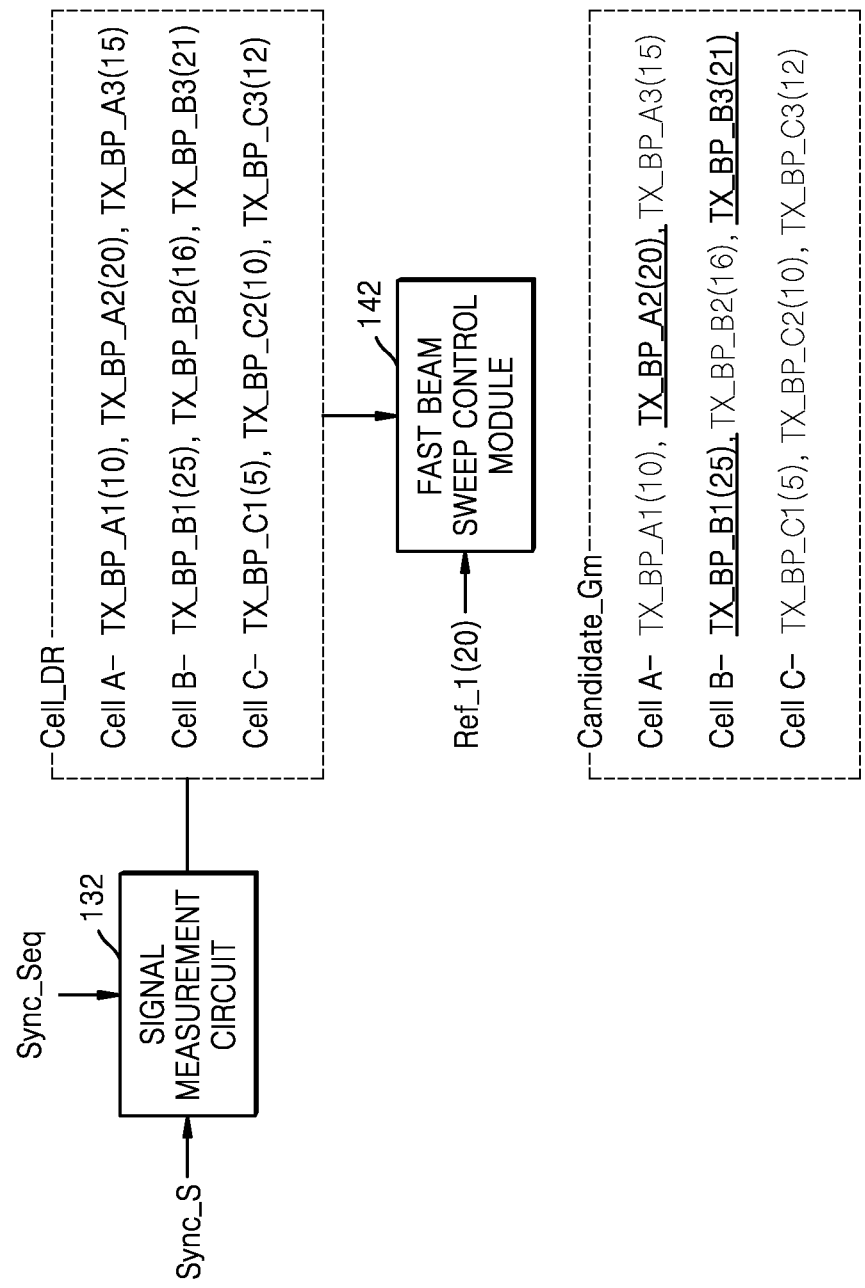

FIGS. 4A and 4B are views for explaining operation S120 in FIG. 3 in detail. Hereinafter, for convenience of description, it is assumed that three cells Cell A (10*a*), Cell B (10*b*) and Cell C (10*c*) perform cell search under the conditions of three transmission beam patterns TX_BP_A1, TX_BP_A2, TX_BP_A3, TX_BP_B1, TX_BP_B2, TX_BP_B3, TX_BP_C1, TX_BP_C2 and TX_BP_C3, respectively. Also, it is to be understood that example embodiments are not limited thereto.

Referring to FIG. 4A, in operation S120', in a state in which the terminal 100 generates a reception beam having an $m^{th}$ reception beam pattern, the signal measurement circuit 132 of the terminal 100 may measure correlation powers between synchronization signals Sync_S received through transmission beams having transmission beam patterns of the plurality of cells Cell A, Cell B and Cell C and synchronization signal sequences Sync_Seq corresponding to the synchronization signals Sync_S, respectively, after operation S110. Various types of synchronization signal sequences Sync_Seq may be stored in advance in the terminal 100, and the signal measurement circuit 132 may measure the correlation powers by respectively matching suitable synchronization signal sequences Sync_Seq to the synchronization signals Sync_S received from the cells Cell A, Cell B and Cell C.

As illustrated in FIG. 4B, the signal measurement circuit 132 may provide a result of measuring the correlated powers to the fast beam sweep control module 142 as a cell search result Cell_DR. For example, referring to the cell search result Cell_DR, correlation power values for synchronization signals received through transmission beams having first, second and third transmission beam patterns TX_BP_A1, TX_BP_A2 and TX_BP_A3 from the first cell Cell A may be '10', '20', and '15', correlation power values for synchronization signals received through transmission beams having first, second and third transmission beam patterns TX_BP_B1, TX_BP_B2 and TX_BP_B3 from the second cell Cell B may be '25', '16', and '21', and correlation power values for synchronization signals received through transmission beams having first, second and third transmission beam patterns TX_BP_C1, TX_BP_C2 and TX_BP_C3 from the third cell Cell C may be '5', '10', and '12', respectively. However, the example embodiments are not limited thereto.

The fast beam sweep control module 142 may determine a candidate group Candidate_Gm using the cell search result Cell_DR and a first reference value Ref_1. For example, the first reference value Ref_1 may be '20', and the fast beam sweep control module 142 compares the cell search result Cell_DR with the first reference value Ref_1 to determine a candidate group Candidate_Gm including transmission beam patterns having correlation powers equal to or greater than the first reference value Ref_1 as candidates. That is, the fast beam sweep control module 142 may determine the candidate group Candidate_Gm including a second pattern TX_BP_A2 of the first cell Cell A, a first pattern TX_BP_B1 of the second cell Cell B, and a third pattern TX_BP_B3 as candidates.

A method of determining the candidate group Candidate_Gm described in FIG. 4B is merely an example embodiment, and example embodiments are not limited thereto. For example, the candidate group Candidate_Gm may be determined using various methods and various criteria using the correlated powers measured from the signal measurement circuit 132.

Figure 5A:
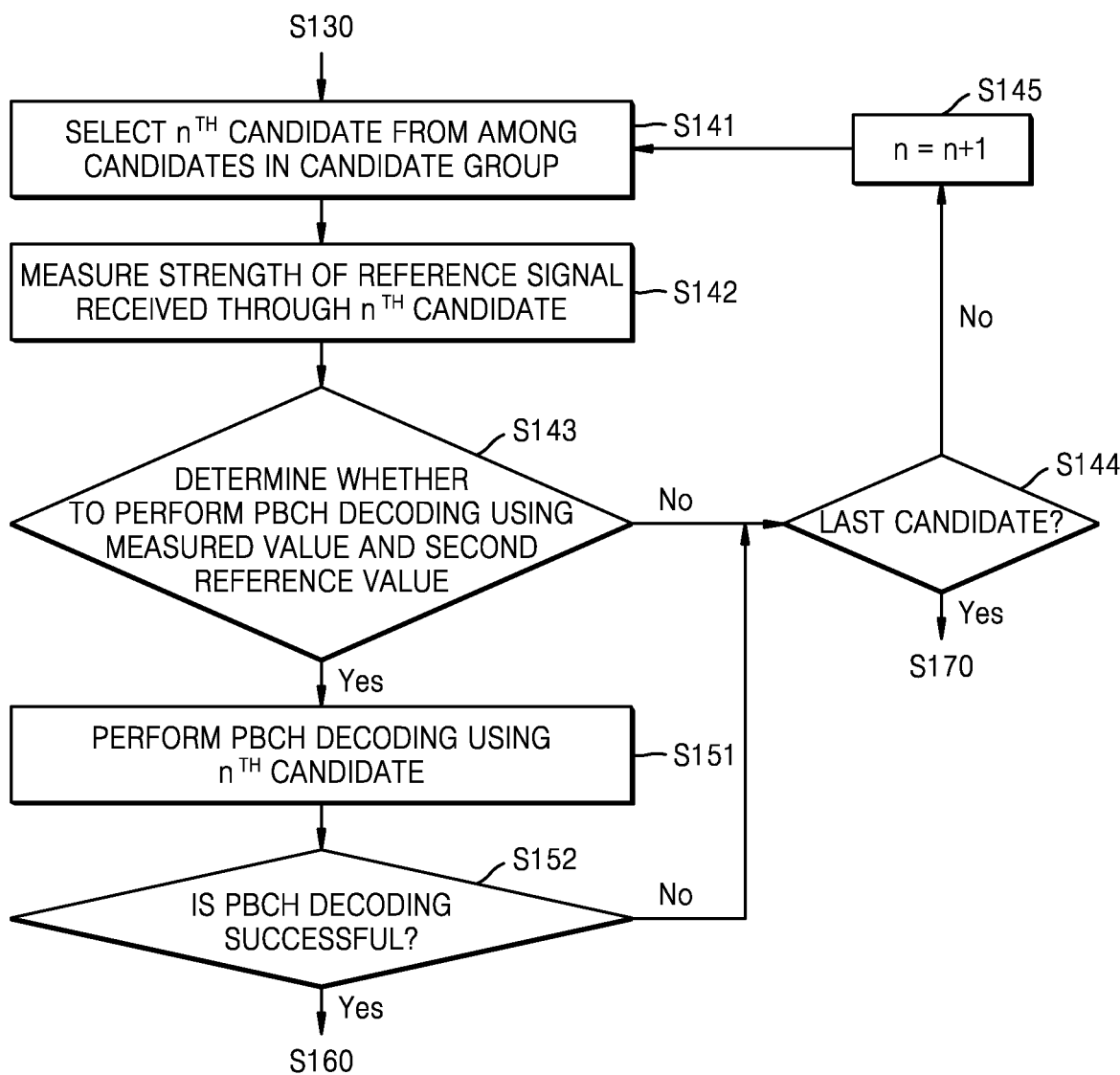
FIGS. 5A and 5B are views for explaining operation S140 in FIG. 3 in detail according to an example embodiment.
Figure 5B:
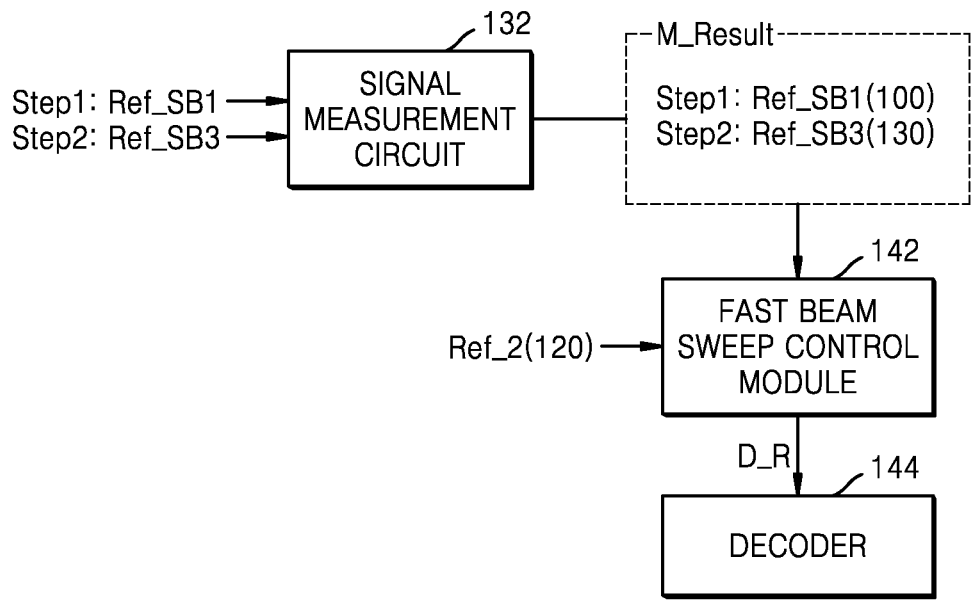
Figure 5C:
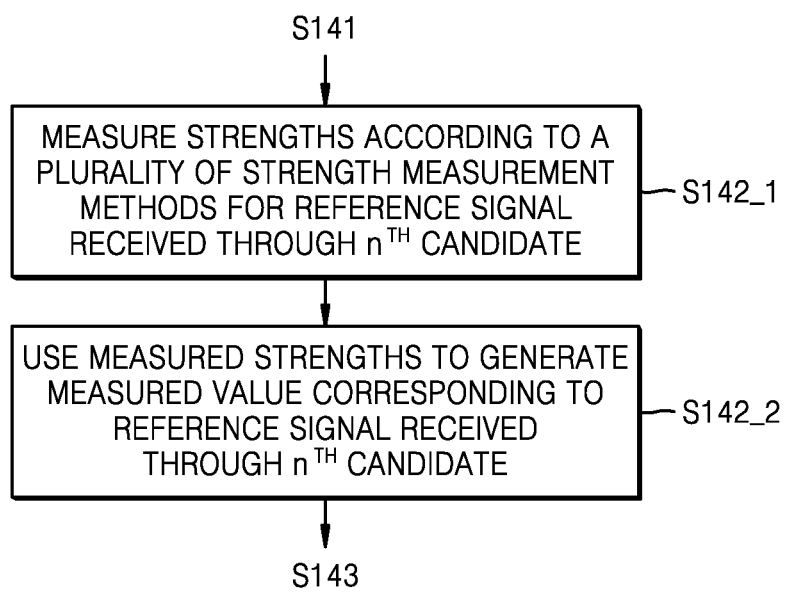
FIG. 5C is a flowchart of explaining an example embodiment of operation S142 in FIG. 5A.

FIGS. 5A and 5B are views for explaining operation S140 in FIG. 3 in detail according to an example embodiment, and FIG. 5C is a flowchart of explaining an example embodiment of operation S142 in FIG. 5A.

Referring to FIG. 5A, in operation S141, the terminal 100 may select an $n^{th}$ candidate to be used for determining whether to perform PBCH decoding from among candidates in a candidate group after operation S130 (of FIG. 3). The terminal 100 may randomly select candidates from the candidate group or select candidates in descending order of correlation powers measured in the candidate group. Referring to FIG. 4B, the terminal 100 may randomly select candidates from the candidate group Candidate_Gm, or may select candidates in an order of a first transmission beam pattern TX_BP_B1 of the second cell Cell B, a third transmission beam pattern TX_BP_B3 of the second cell Cell B, and a second transmission beam pattern TX_BP_A2 of the first cell Cell A that are in the descending order of the measured correlation powers.

In operation S142, the signal measurement circuit 132 of the terminal 100 may measure the strength of a reference signal received through the $n^{th}$ candidate. For example, the signal measurement circuit 132 may measure the strength of a reference signal Ref_SB1 received from the second cell Cell B through a transmission beam having a first transmission beam pattern TX_BP_B1 of the second cell Cell B that is the $n^{th}$ candidate. In an example embodiment, the signal measurement circuit 132 may measure the strength of the reference signal Ref_SB1 through at least one strength measurement method. For example, the strength of the reference signal Ref_SB1 may be any one of a received signal strength indication (RSSI), a carrier to interference and noise ratio (CINR), a signal to interference ratio (SIR), and a reference signal received power (RSRP) value. The signal measurement circuit 132 may provide a measurement result M_Result to the fast beam sweep control module 142 of the terminal 100.

In operation S143, the fast beam sweep control module 142 may determine whether to perform PBCH decoding by using a measured value and a second reference value. For example, the fast beam sweep control module 142 may compare the strength of the reference signal Ref_SB1 received from the second cell Cell B with a second reference value Ref_2 to determine whether to decode a PBCH received through the transmission beam having the first transmission beam pattern TX_BP_B1.

In operation S144, the fast beam sweep control module 142 may determine not to perform PBCH decoding when the measured value is less than the second reference value (No in operation S143) and may determine whether the $n^{th}$ candidate is the last candidate in the candidate group. In operation S145, when the $n^{th}$ candidate is not the last candidate (No in operation S144), the terminal 100 may count up the value of n and perform operation S141 again. Otherwise, when the $n^{th}$ candidate is the last candidate (Yes in operation S144), the terminal 100 may perform operation S170 (of FIG. 3). For example, the terminal 100 may perform operation S141 of selecting a third transmission beam pattern TX_BP_B3 of the second cell Cell B as a next candidate.

The signal measurement circuit 132 may measure the strength of a reference signal Ref_SB3 received from the second cell Cell B through a transmission beam having the third $n^{th}$ transmission beam pattern TX_BP_B3 that is the next $n^{th}$ candidate. In operation S151, the fast beam sweep control module 142 may determine to perform PBCH decoding when the measured value is equal to or greater than the second reference value (Yes in operation S143), and may perform PBCH decoding by using the $n^{th}$ candidate. For example, the fast beam sweep control module 142 may determine to decode the PBCH received from the second cell Cell B through the transmission beam having the third transmission beam pattern TX_BP_B3 because the strength of the reference signal Ref_SB3 received from the second cell Cell B is greater than the second reference value Ref_2. The fast beam sweep control module 142 may provide a decoding determination result D_R to a decoder 144 of the terminal 100.

In operation S152, the decoder 144 may perform the PBCH decoding based on the decoding determination result D_R and may determine whether the PBCH decoding is successful. When the PBCH decoding fails (No in operation S152), operation S144 may be performed. Otherwise, when the PBCH decoding is successful (Yes in operation S152), operation S160 (of FIG. 3) may be performed. System information of the PBCH may include criteria for the success and failure of the PBCH decoding and the failure of the PBCH decoding may mean that it is not appropriate that the $n^{th}$ candidate and a current reception beam pattern are determined as a transmission and reception beam pattern pair.

FIGS. 5A and 5B refer to an example embodiment in which the terminal 100 randomly or sequentially selects candidates in the candidate group one by one to determine whether to perform PBCH decoding and performs PBCH decoding according to the result.

Further referring to FIG. 5C, in operation S142_1, which may be performed after operation S141 in FIG. 5A, the signal measurement circuit 132 may measure strengths according to a plurality of strength measurement methods for the reference signal received through the $n^{th}$ candidate. In an example embodiment, the signal measurement circuit 132 may measure strengths corresponding to the RSSI, the CINR, the SIR, and the RSRP value with respect to the reference signal received through the $n^{th}$ candidate. In operation S142_2, the signal measurement circuit 132 may use the measured strengths to generate a measured value corresponding to the reference signal received through the $n^{th}$ candidate. For example, the signal measurement circuit 132 may generate the measured value by placing different or equal weights on the average of the measured strengths or the measured strengths, respectively. Thereafter, operation S143 of FIG. 5A may be performed.

Figure 6A:
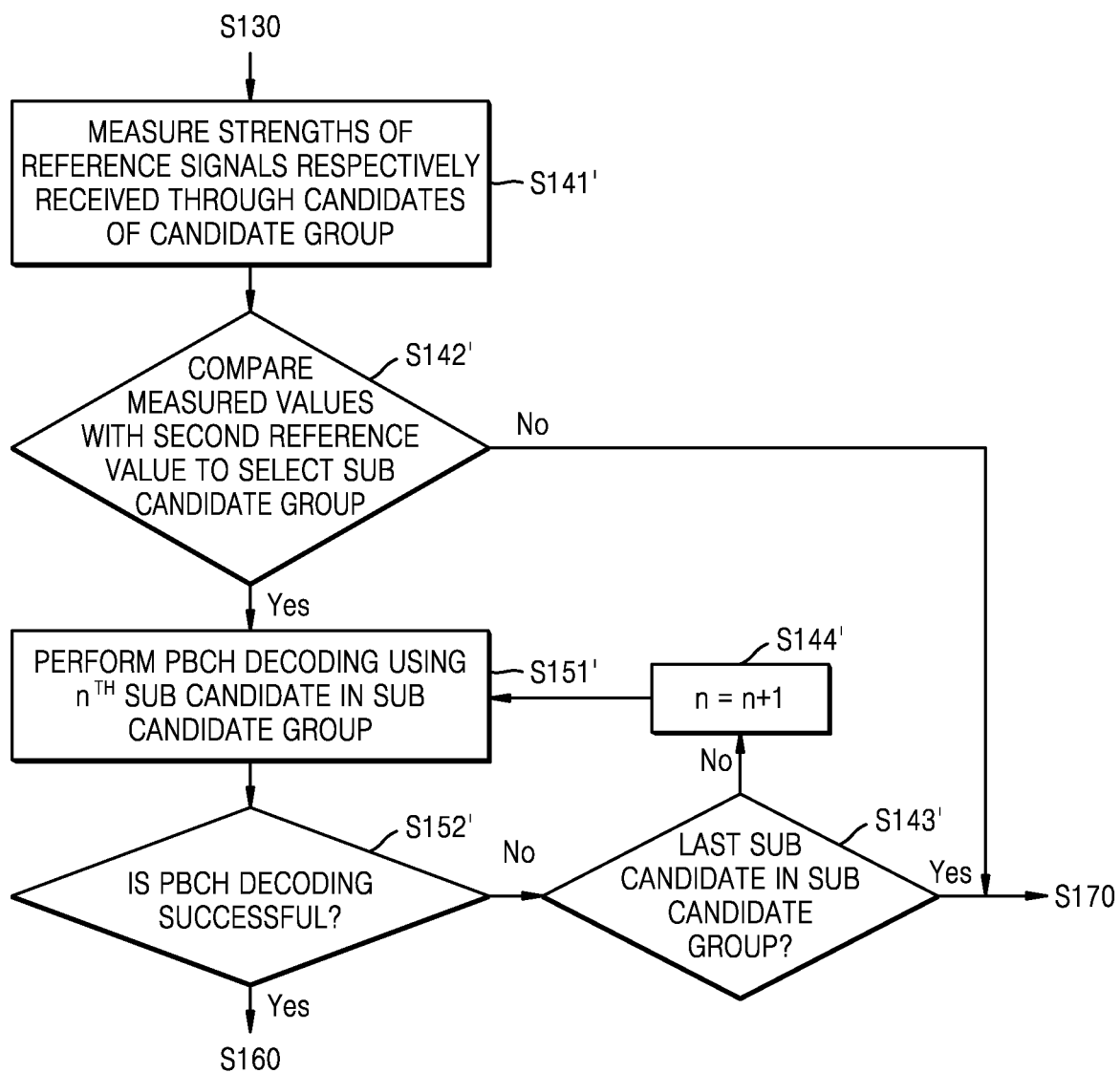
FIGS. 6A and 6B are views for explaining operation S140 in FIG. 3 in detail according to an example embodiment.
Figure 6B:
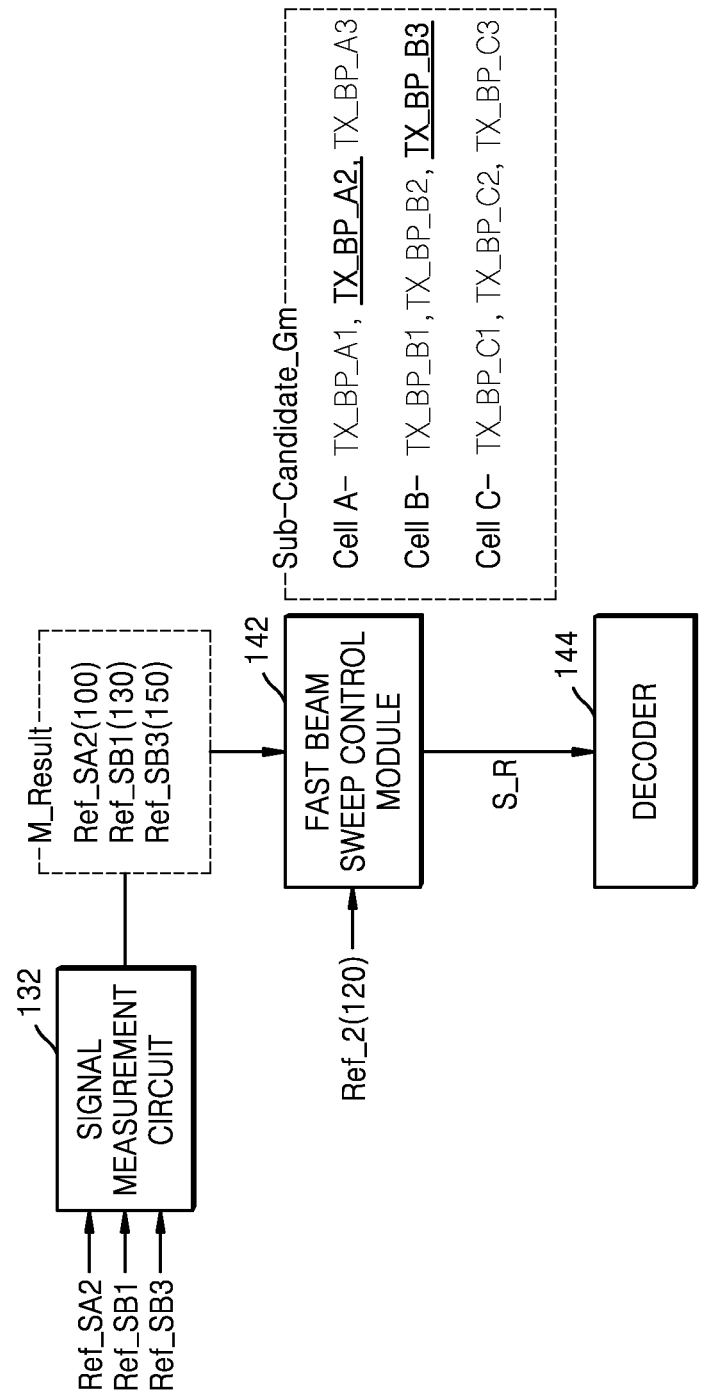

FIGS. 6A and 6B are views for explaining operation S140 in FIG. 3 in detail according to an example embodiment.

Referring to FIGS. 6A and 6B, in operation S141', the signal measurement circuit 132 of the terminal 100 may measure the strengths of the reference signals respectively received through candidates of a candidate group after operation S130 (of FIG. 3). Further referring to FIG. 4B, the signal measurement circuit 132 may measure the strengths of reference signals Ref_SA2, Ref_SB1, and Ref_SB3 respectively received through the candidates TX_BP_A2, TX_BP_B1, and TX_BP_B3 of the candidate group Candidate_Gm. The signal measurement circuit 132 may provide the measurement result M_Result to the fast beam sweep control module 142 of the terminal 100.

In operation S142', the fast beam sweep control module 142 may compare the measured values with the second reference value to select a sub candidate group. For example, the fast beam sweep control module 142 compares the measurement result M_Result with the second reference value Ref_2 and may select a sub candidate group Sub-Candidate_Gm by finding a sub candidate corresponding to a measured value greater than the second reference value Ref_2. For example, as illustrated in FIG. 6B, the fast beam sweep control module 142 may select the second transmission beam pattern TX_BP_A2 of the first cell Cell A and the third transmission beam pattern TX_BP_B3 of the second cell Cell B corresponding to the measured value greater than the second reference value Ref_2 of '120' to be included in the sub-candidate group Gm. The fast beam sweep control module 142 may provide a selection result S_R for the sub candidate group Sub-Candidate_Gm to the decoder 144 of the terminal 100.

In operation S151', the decoder 144 may perform PBCH decoding by using an $n^{th}$ sub candidate in the sub candidate group. That is, the decoder 144 may decode a PBCH received through the $n^{th}$ sub candidate. In an example embodiment, the decoder 144 may randomly select a sub-candidate in the sub-candidate group or select a sub-candidate in descending order of strengths of measured reference signals. For example, the decoder 144 may randomly select a sub candidate in the sub-candidate group Sub-Candidate_Gm or may select a sub candidate in an order of the second transmission beam pattern TX_BP_A2 of the first cell Cell A and the third transmission beam pattern TX_BP_B3 of the second cell Cell B, that is, in descending order of strengths of the measured reference signals.

In operation S152', the decoder 144 may determine whether the PBCH decoding is successful or not. In operation S143', the decoder 144 may determine whether the sub candidate of operation S143' is the last sub candidate in the sub candidate group when the PBCH decoding fails (No in operation S152'). The decoder 144 may perform operation S151' after counting up the value of n when the sub candidate of operation S143' is not the last sub candidate (No in operation S143'), and may perform operation S170 when the sub candidate of operation S143' is the last sub candidate (Yes in operation S143'). Otherwise, when decoding is successful (Yes in operation S152'), operation S160 (of FIG. 3) may be performed.

FIGS. 6A and 6B refer to an example embodiment in which the terminal 100 selects a sub candidate group from the candidate group, measures strengths of reference signals corresponding to the sub candidate group at a time, finds a sub candidate equal to or greater than a certain reference value, and performs PBCH decoding.

Figure 7:
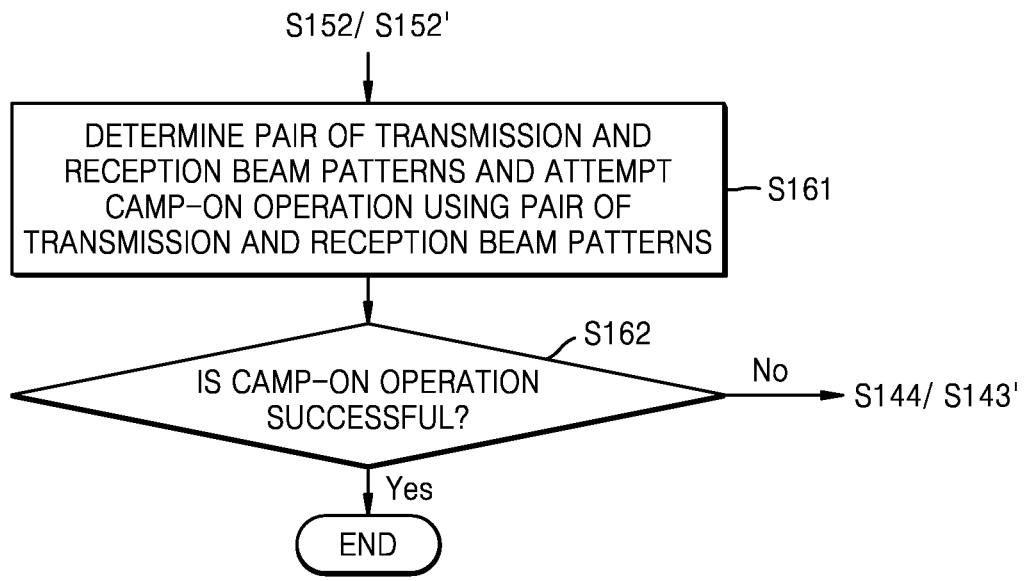
FIG. 7 is a flowchart of explaining operation S160 in FIG. 3 in detail according to an example embodiment.

FIG. 7 is a flowchart of explaining operation S160 in FIG. 3 in detail according to an example embodiment.

Referring to FIG. 7, in operation S161, the terminal 100 may determine a transmission and reception beam pattern pair based on a result of the PBCH decoding and attempt a camp-on operation on a corresponding cell using the transmission and reception beam pattern pair after operation S152 (of FIG. 5A) or operation S152' (of FIG. 6A).

In operation S162, the terminal 100 may determine whether the camp-on operation is successful. The terminal 100 may perform operation S144 (of FIG. 5A) or operation S143' (of FIG. 6A) when the camp-on operation fails (No in operation S162) and may terminate an operation for finding the transmission and reception beam pattern pair when the camp-on operation is successful (Yes in operation S162). Hereinafter, example embodiments for minimizing a camp-on failure of the terminal 100 in an operation of the terminal 100 for finding the transmission and reception beam pattern pair according to an example embodiment will be described.

Figure 8:
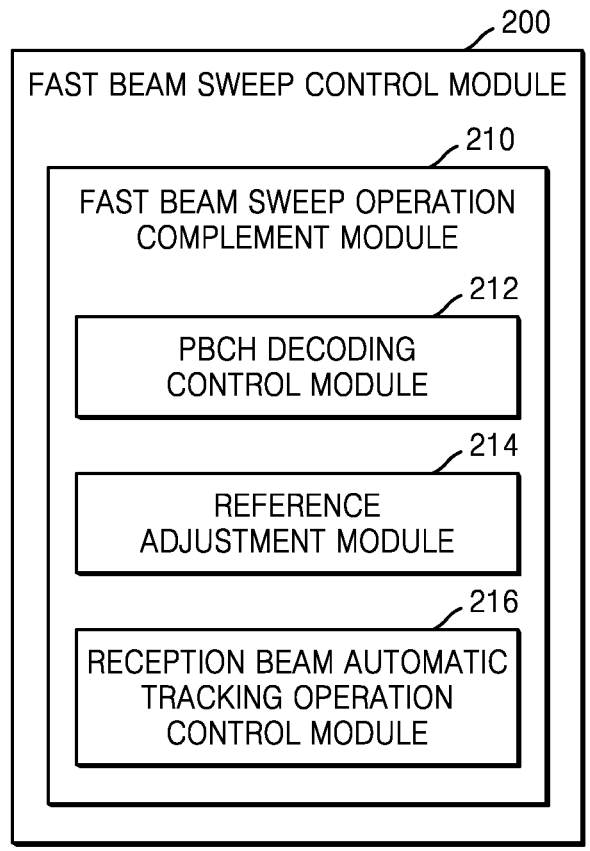
FIG. 8 is a block diagram of a fast beam sweep control module according to an example embodiment.

FIG. 8 is a block diagram of a fast beam sweep control module 200 according to an example embodiment.

Referring to FIG. 8, the fast beam sweep control module 200 may include a fast beam sweep operation complement module 210 for minimizing a camp-on failure of a terminal 100. The fast beam operation complement module 210 may include a PBCH decoding control module 212, a reference adjustment module 214, and a reception beam automatic tracking operation control module 216.

The PBCH decoding control module 212 may measure a variation in a wireless communication environment between a first point in time for determining whether to decode a PBCH of the terminal 100 and a second point in time for performing PBCH decoding, and may stop the PBCH decoding based on the variation in the wireless communication environment. That is, even if the PBCH decoding succeeds when the variation in the wireless communication environment between the first point in time and the second point in time is equal to or greater than a threshold value, the PBCH decoding control module 212 may stop PBCH decoding in advance to minimize unnecessary operations because the terminal 100 is likely to fail camp-on due to a change in the wireless communication environment thereafter. An operation of the PBCH decoding control module 212 will be described with reference to FIG. 9.

The reference adjustment module 214 may adjust at least one of a reference value used in cell search and reference values used in determining whether to perform PBCH decoding so that the terminal 100 may succeed in the camp-on operation. The reference adjustment module 214 may determine a camp-on failure behavior of the terminal 100 and adjust at least one of the reference values based on the behavior. For example, the behavior of the terminal 100 may be identified by the terminal based on previous camp-on failures. An operation of the reference adjustment module 214 will be described with reference to FIG. 10 in detail.

The reception beam automatic tracking operation control module 216 may control a reception beam automatic tracking operation to find a transmission and reception beam pattern capable of providing a better reception quality than that of a current transmission and reception beam pattern when the reception beam automatic tracking operation control module 216 succeeds in the camp-on operation on a corresponding cell after determining the transmission and reception beam pattern of the terminal 100 according to example embodiments. In an example embodiment, the reception beam automatic tracking operation conforms to a standard that defines 5G (or new radio (NR)) in the 3rd generation partnership project (3GPP), and detailed descriptions thereof will not be given herein. An operation of the reception beam automatic tracking operation control module 216 will be described with reference to FIG. 11 in detail.

Figure 9:
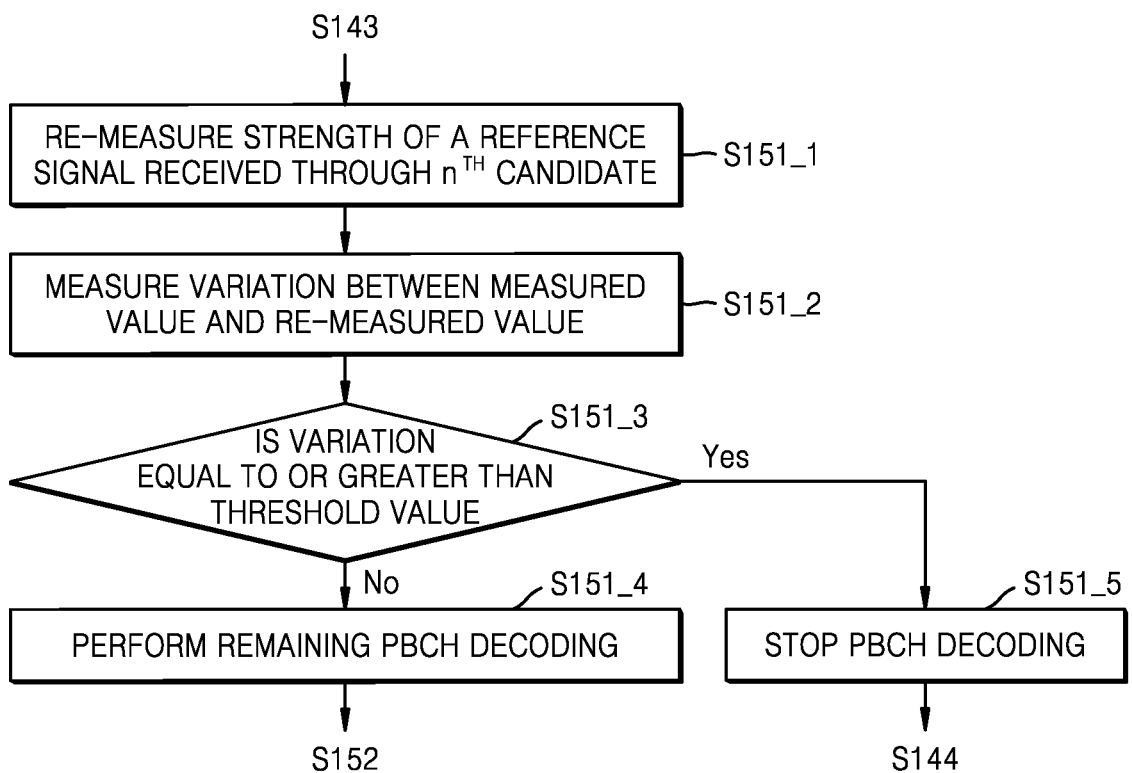
FIG. 9 is a flowchart of an operation of a physical broadcast channel (PBCH) decoding control module in FIG. 8 according to an example embodiment.

FIG. 9 is a flowchart of an operation of a PBCH decoding control module 212 in FIG. 8 according to an example embodiment.

Referring to FIGS. 8 and 9, in operation S151_1, when PBCH decoding is performed using an $n^{th}$ candidate after operation S143 (of FIG. 5A), the PBCH decoding control module 212 may re-measure the strength of a reference signal received through the $n^{th}$ candidate (S151_1). In operation S151_2, the PBCH decoding control module 212 may measure a variation between the measured value and the re-measured value in operation S142 (of FIG. 5A). In operation S151_3, the PBCH decoding control module 212 may determine whether the variation is equal to or greater than a threshold value. In operation S151_5, when the variation is equal to or greater than the threshold value (Yes in S151_3), the PBCH decoding control module 212 may stop PBCH decoding currently in progress and may perform operation S144 (of FIG. 5A). Further, the PBCH decoding control module 212 may control a baseband processor to perform the remaining PBCH decoding when the variation is less than the threshold value (No in operation S151_3). Thereafter, operation S152 (of FIG. 5A) may be performed.

Figure 10:
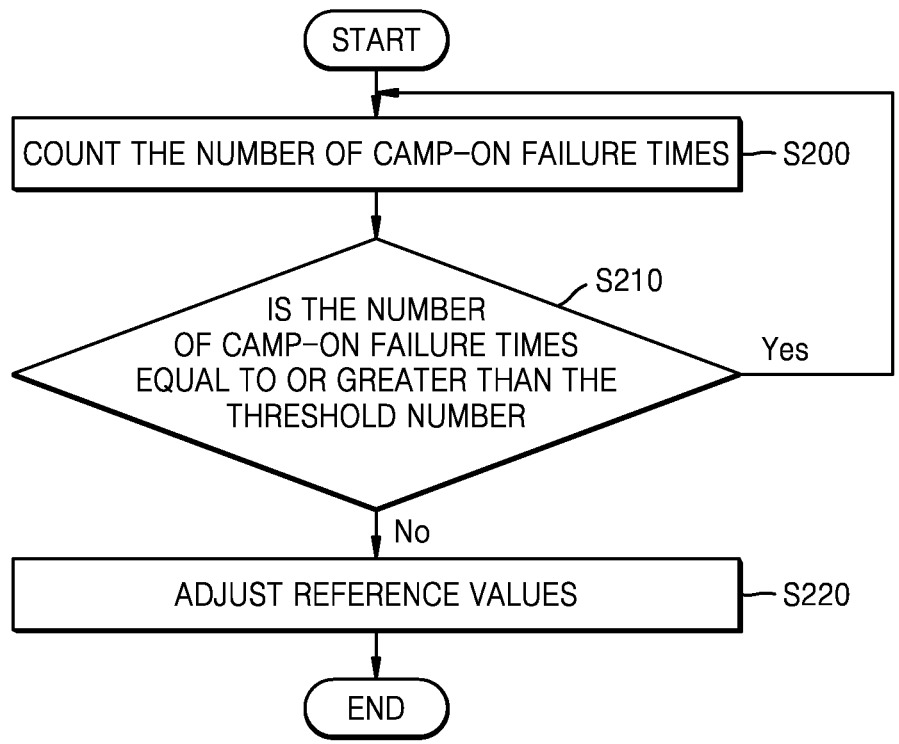
FIG. 10 is a flowchart of an operation of a reference adjustment module in FIG. 8 according to an example embodiment.

FIG. 10 is a flowchart of an operation of the reference adjustment module 214 in FIG. 8 according to an example embodiment.

Referring to FIGS. 8 and 10, in operation S200, the reference adjustment module 214 may count the number of camp-on failure times of the terminal 100 among operations for determining a transmission and reception beam pattern pair of the terminal 100. In operation S151_3, the reference adjustment module 214 may determine whether the number of camp-on failure times is equal to or greater than a threshold number. When the number of camp-on failure times is equal to or greater than the threshold number (Yes in operation S210), the reference adjustment module 214 may adjust at least one of a reference value used in cell search and reference values used in determining whether to perform PBCH decoding. For example, the reference adjustment module 214, when the number of camp-on failure times is equal to or greater than the threshold number, may increase at least one of the reference values so that the terminal 100 may improve determination of the transmission and reception beam pattern pair.

Figure 11:
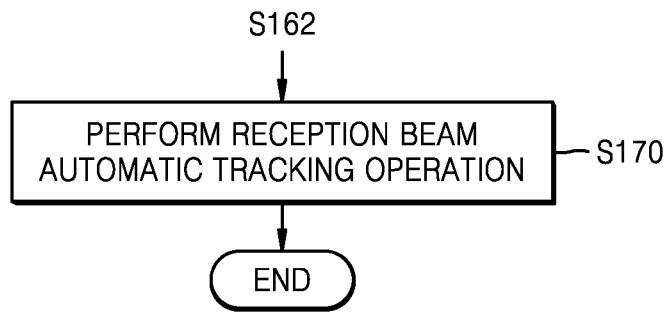
FIG. 11 is a flowchart of an operation of a reception beam automatic tracking operation control module in FIG. 8 according to an example embodiment.

FIG. 11 is a flowchart of an operation of the reception beam automatic tracking operation control module 216 in FIG. 8 according to an example embodiment.

Referring to FIGS. 8 and 11, in operation S170, the reception beam automatic tracking operation control module 216 may immediately perform the reception beam automatic tracking operation within a certain time after operation S160 (of FIG. 3).

Figure 12:
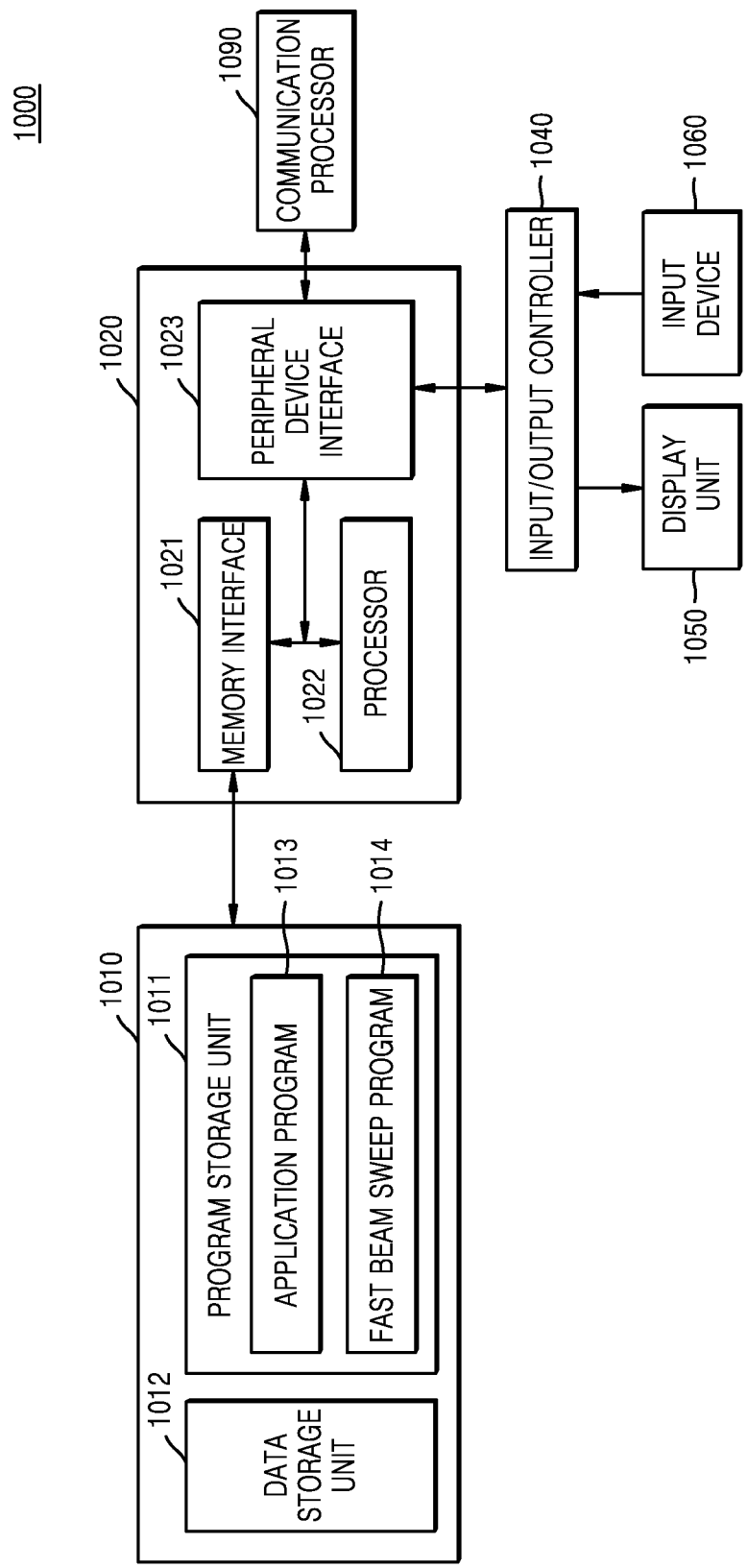
FIG. 12 is a block diagram of an electronic device for determining a transmission and reception beam pattern pair, according to an example embodiment.

FIG. 12 is a block diagram of an electronic device 1000 for determining a transmission and reception beam pattern pair, according to an example embodiment.

Referring to FIG. 12, the electronic device 1000 may include a memory 1010, a processor unit 1020, an input/output controller 1040, a display unit 1050 (e.g., a display interface or a display device), an input device 1060, and a communication processor 1090. Here, a plurality of memories 1010 may be included. The components are as follows.

The memory 1010 may include a program storage unit 1011 for storing a program for controlling operations of the electronic device and a data storage unit 1012 for storing data generated during program execution. The data storage unit 1012 may store data necessary for operations of an application program 1013 and a fast beam sweep program 1014. The program storage unit 1011 may include the application program 1013 and the fast beam sweep program 1014. Here, the programs included in the program storage unit 1011 are a set of instructions, which may be expressed as an instruction set.

The application program 1013 includes an application program running on the electronic device. That is, the application program 1013 may include instructions of an application driven by a processor 1022. The fast beam sweep program 1014 may control an operation of determining a transmission and reception beam pattern pair according to example embodiments. That is, the electronic device 1000 may perform a beam sweep operation in units of one reception beam pattern through the fast beam sweep program 1014.

A peripheral device interface 1023 may control connection of the processor 1022 and a memory interface 1021 to an input/output peripheral device of a base station. The processor 1022 controls the base station to provide a corresponding service using at least one software program. The processor 1022 may execute at least one program stored in the memory 1010 to provide a service corresponding to the program.

The input/output controller 1040 may provide an interface between an input/output device, such as the display unit 1050 and the input device 1060, and the peripheral device interface 1023. The display unit 1050 displays state information, input characters, moving pictures, still pictures, and the like. For example, the display unit 1050 may display application program information driven by the processor 1022.

The input device 1060 may provide input data generated by selection of the electronic device to the processor unit 1020 through the input/output controller 1040. The input device 1060 may include a keypad including at least one hardware button and a touchpad for sensing touch information. For example, the input device 1060 may provide touch information such as a touch, a touch movement, and a touch release sensed through a touchpad to the processor 1022 through the input/output controller 1040.

The electronic device 1000 may include the communication processor 1090 that performs communication functions for voice communication and data communication, and the fast beam sweep program 1014 may control the communications processor 1090 to select a reception beam pattern and to generate a reception beam having the selected reception beam pattern.

Figure 13:
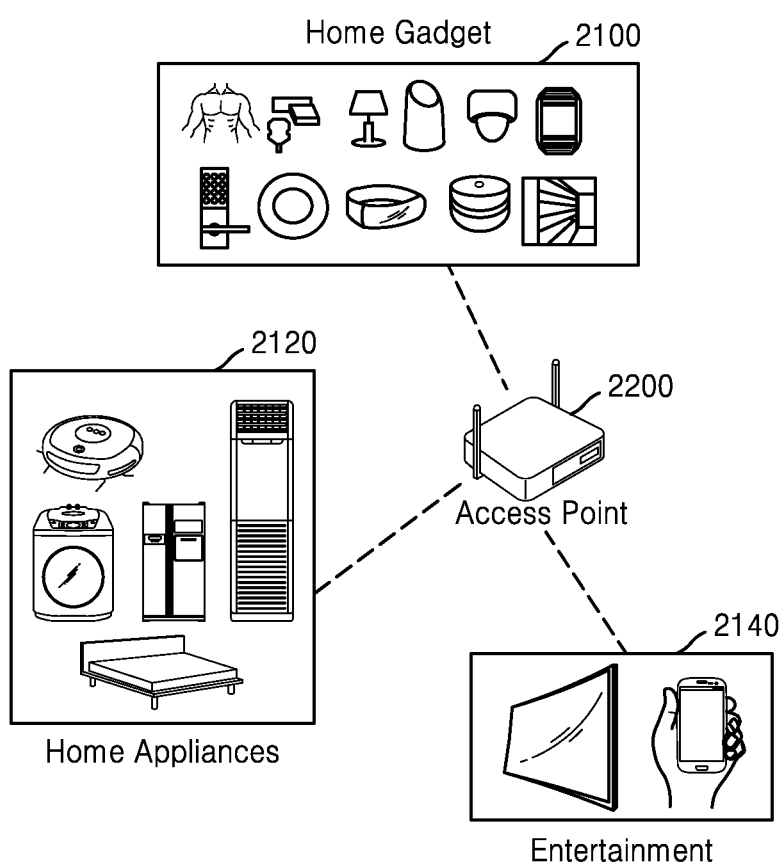
FIG. 13 is a view of communication devices performing an operation for determining transmission and reception beam patterns, according to an example embodiment.

FIG. 13 is a view of communication devices performing an operation for determining transmission and reception beam patterns, according to an example embodiment.

Referring to FIG. 13, a home gadget 2100, a household appliance 2120, an entertainment device 2140, and an access point (AP) 2200 may perform transmission/reception beam pattern determination operations according to example embodiments. In some example embodiments, the home gadget 2100, the household appliance 2120, the entertainment device 2140, and the AP 2200 may implement, or be a part of, an Internet of Things (IoT) network system. It should be understood that the communication devices shown in FIG. 13 are only examples, and other communication devices not shown in FIG. 13 may be included.

Example embodiments have been illustrated in the drawings and described in the detailed description. Although specific terms are used to explain these example embodiments, the specific terms are not intended to restrict the scope of the present disclosure. It will be understood by one of ordinary skill in the art that various changes in form and details may be made without departing from the spirit and scope of the present disclosure.

What is claimed is:

1. A method of operating a terminal in a wireless communication system, the method comprising:
    selecting a first pattern as a pattern of a reception beam;
    searching for a plurality of cells in the wireless communication system using the reception beam of the first pattern;
    determining a first candidate group comprising at least one candidate for a transmission and reception beam pattern pair with the first pattern of the reception beam, from among transmission beam patterns of the plurality of cells based on the searching, wherein each of the at least one candidate corresponds to a transmission beam pattern of the transmission beam patterns and a cell of the plurality of cells;
    determining whether to decode a physical broadcast channel (a PBCH) received from a first candidate of the first candidate group;
    decoding the PBCH based on the determining; and
    selecting one of the transmission beam patterns for the transmission and reception beam pattern pair with the first pattern of the reception beam from the first candidate group based on the decoding.

2. The method of claim 1, wherein the searching for the plurality of cells further comprises:
    measuring correlation powers between synchronization signals received through the transmission beam patterns of the plurality of cells and sequences respectively corresponding to the synchronization signals.

3. The method of claim 2, wherein the determining of the first candidate group further comprises:
    identifying the transmission beam pattern corresponding to each correlation power that is equal to or greater than a first reference value as the at least one candidate.

4. The method of claim 3, wherein the determining of whether to decode the PBCH further comprises:
    selecting a candidate from the first candidate group according to a magnitude of the correlation power; and
    determining whether to decode the PBCH received through the candidate by using the candidate.

5. The method of claim 1, wherein the determining of whether to decode the PBCH further comprises:
    selecting the first candidate from the first candidate group;
    generating a first measured value corresponding to strength of a first reference signal received through the first candidate; and
    determining whether to decode a first PBCH received through the first candidate using the first measured value and a second reference value.

6. The method of claim 5, wherein the generating of the first measured value further comprises:
    measuring strengths for the first reference signal based on a plurality of strength measurement methods; and
    combining the strengths to generate the first measured value corresponding to the first candidate.

7. The method of claim 5, wherein the determining of whether to decode the first PBCH comprises determining to decode the first PBCH based on the first measured value being equal to or greater than the second reference value.

8. The method of claim 1, wherein the determining of whether to decode the PBCH received from the first candidate group further comprises:
    generating measured values corresponding to strengths of reference signals received through a plurality of first candidates of the first candidate group;
    comparing the measured values with a second reference value;
    identifying a sub candidate group from the first candidate group, the sub candidate group including sub candidates with a corresponding measured value that exceeds the second reference value; and
    determining whether to decode the PBCH using the sub candidate group.

9. The method of claim 8, wherein the determining of whether to decode the PBCH using the sub candidate group further comprises:
    selecting a sub candidate from the sub candidate group according to a magnitude of the measured values; and
    determining whether to decode the PBCH received through the candidate using the sub candidate.

10. The method of claim 1, further comprising, based on the decoding of the PBCH failing:
    selecting a second pattern as the pattern of the reception beam;
    re-searching for the plurality of cells in the wireless communication system using the reception beam of the second pattern;
    determining a second candidate group comprising at least one second candidate for the transmission and reception beam pattern pair with the second pattern of the reception beam, from among the transmission beam patterns of the plurality of cells, based on the re-searching;
    re-determining whether to decode the PBCH received from a second candidate of the second candidate group;
    decoding the PBCH based on the re-determining; and
    selecting one of the transmission beam patterns from the transmission and reception beam pattern pair with the second pattern of the reception beam from the second candidate group based on the decoding.

11. The method of claim 1, wherein the determining of whether to decode the PBCH comprises measuring a variation between a measured value generated by measuring strength of a reference signal received through the first candidate and a re-measured value generated by re-measuring the strength of the reference signal received through the candidate in the decoding of the PBCH; and
    wherein the method of operating the terminal further comprises determining whether to stop the decoding of the PBCH received through the candidate, based on the variation.

12. The method of claim 1, wherein the method of operating the terminal further comprises performing a camp-on operation on the cell corresponding to the one of the transmission beam patterns.

13. The method of claim 1, further comprising:
    counting a number of camp-on failures;
    determining whether the number of camp-on failures is equal to or greater than a threshold number; and adjusting at least one from among a first reference value used in searching for the plurality of cells based on whether the number of camp-on failures is equal to or greater than the threshold number and a second reference value used in determining whether to decode the PBCH.

14. A terminal configured to operate in a wireless communication system, the terminal comprising:
a plurality of antennas; and
a baseband processor configured to:
control the plurality of antennas such that a reception beam of the terminal has a pattern;
control a beam sweep operation using the reception beam of the pattern;
search for a plurality of cells in the wireless communication system using the pattern the reception beam as a first pattern for a first beam sweep operation;
determine a first candidate group comprising at least one candidate that is selectable for the transmission and reception beam pattern pair with the first pattern of the reception beam from transmission beam patterns of the plurality of cells based on a result of the searching;
determine whether to decode a physical broadcast channel (a PBCH) received from a first candidate of the first candidate group;
decode the PBCH based on the determining; and
select one of the transmission beam patterns for the transmission and reception beam pattern pair with the first pattern of the reception beam from the first candidate group.

15. The terminal of claim 14, wherein the baseband processor is further configured to, based on failing to select the one of the transmission beam patterns based on the first beam sweep operation, control the plurality of antennas such that the reception beam of the terminal has a second pattern and perform a second beam sweep operation by using the reception beam of the second pattern.

16. The terminal of claim 14, wherein the terminal further comprises a signal measurement circuit configured to measure correlation powers between synchronization signals received through the transmission beam patterns of the plurality of cells and sequences respectively corresponding to the synchronization signals, and
wherein the baseband processor is further configured to identify a transmission beam pattern corresponding to each correlation power that is equal to or greater than a first reference value from among the correlation powers as the at least one candidate.

17. The terminal of claim 14, wherein the baseband processor is further configured to select a candidate from the first candidate group and determine whether to decode the PBCH received through the candidate using a measured strength corresponding to strength of a reference signal received through the candidate and a second reference value, and
wherein the terminal further comprises a signal measurement circuit configured to measure the strength of the reference signal.

18. The terminal of claim 17, wherein the baseband processor is further configured to determine to decode the PBCH received through the candidate based on the measured strength of the reference signal being equal to or greater than the second reference value, and determine whether to stop decoding the PBCH based on a variation between re-measured strength of the reference signal and the measured strength of the reference signal when decoding the PBCH, and
wherein the signal measurement circuit is further configured to re-measure the strength of the reference signal when decoding the PBCH.

19. The terminal of claim 14, wherein the baseband processor is further configured to, based on the decoding of the PBCH received through the first candidate selected using the first candidate selected in the first candidate group being successful, terminate the first beam sweep operation and to determine the first pattern of the reception beam and the first candidate for the transmission and reception beam pattern pair.

20. A non-transitory computer-readable storage medium storing computer readable instructions, the computer readable instructions, when executed by a processor in a terminal that determines a transmission and reception beam pattern pair, cause the terminal to:
select a first pattern as a pattern of a reception beam;
search for a plurality of cells using the reception beam of the first pattern;
determine a first candidate group comprising a candidate for the transmission and reception beam pattern pair with the first pattern of the reception beam, from among transmission beam patterns of the plurality of cells;
determining whether to decode a physical broadcast channel (a PBCH) received from a first candidate of the first candidate group;
decode the PBCH based on the determining; and
select one of the transmission beam patterns for the transmission and reception beam pattern pair with the first pattern of the reception beam based on the decoding.

* * * * *